United States Patent [19]

Oliver

[11] Patent Number: 5,202,916
[45] Date of Patent: Apr. 13, 1993

[54] SIGNAL PROESSING CIRCUIT FOR USE IN TELEMETRY DEVICES

[75] Inventor: Stewart W. Oliver, Venice, Calif.

[73] Assignee: Telegenics Inc., Los Angeles, Calif.

[21] Appl. No.: 565,947

[22] Filed: Aug. 10, 1990

[51] Int. Cl.$^5$ .......................................... H04M 11/00
[52] U.S. Cl. .................................... 379/106; 379/107
[58] Field of Search ................ 379/107, 106, 102, 104, 379/105, 93; 340/870.02

[56] References Cited

U.S. PATENT DOCUMENTS

| | | |
|---|---|---|
| 3,588,357 | 6/1971 | Sellari, Jr. . |
| 3,656,112 | 4/1972 | Paull . |
| 3,868,640 | 2/1975 | Binnie et al. . |
| 3,899,639 | 8/1975 | Clevely . |
| 3,922,490 | 11/1975 | Pettis . |
| 4,059,727 | 11/1977 | Kingswell et al. ................ 379/107 |
| 4,180,709 | 12/1979 | Cosgrove et al. . |
| 4,213,119 | 7/1980 | Ward et al. . |
| 4,315,248 | 2/1982 | Ward . |
| 4,489,220 | 12/1984 | Oliver . |
| 4,540,849 | 9/1985 | Oliver . |
| 4,578,536 | 3/1986 | Oliver . |
| 4,642,635 | 2/1987 | Snaper . |
| 4,710,919 | 12/1987 | Oliver . |
| 4,811,389 | 3/1989 | Balch ................................ 379/107 |
| 4,839,917 | 6/1989 | Oliver .............................. 379/45 |

OTHER PUBLICATIONS

Neptune T1000.

Primary Examiner—James L. Dwyer
Assistant Examiner—Stella L. Woo
Attorney, Agent, or Firm—Mark P. Kahler

[57] ABSTRACT

A signal processing circuit is provided, one embodiment of which is employed in an inbound telemetry device such as an inbound MIU, another embodiment of which is employed in an outbound telemetry device such as an outbound MIU, for example. The inbound signal processing circuit monitors and senses conditions on a phone line coupled thereto to determine when the line is available or not available for use by the inbound telemetry device. More specifically, the processing circuit includes a sensing circuit which senses when other communications devices coupled to the phone line are off-hook and hence the line is not available. The processing circuit advantageously employs the same sensing circuit to determine when ringing signals are present on the line such that the line is not available. The processing circuit thus provides line status information to the inbound telemetry device so that the telemetry device is informed as to those times at which the telemetry device should and should not transmit collected information. The outbound signal processing circuit employs circuitry similar to the inbound processing circuit above plus analog to digital conversion circuitry to convert analog phone line information signals such as alert signals to digital signals. This embodiment includes circuitry to either pass the converted digital signals to an outbound telemetry device when the line is available or prevent the passage of converted digital signals to the outbound telemetry device if the line is not available.

8 Claims, 4 Drawing Sheets

SIGNAL PROESSING CIRCUIT FOR USE IN TELEMETRY DEVICES

CROSS REFERENCE TO RELATED PATENT APPLICATIONS

This patent application is related to my copending patent application entitled "Outbound Telemetry Device" which is filed concurrently herewith.

BACKGROUND OF INVENTION

This invention relates in general to data collection systems and, more particularly, to status indicators for telephone line powered telemetry devices.

During the span of the last decade, the technical feasibility of employing telemetry devices to collect data from remote sites has proven to be a viable technology. The continuing development of this fledgling industry has resulted in the development of telemetry devices which are dedicated to flawless, highly reliable performance at very low costs. This new class of telemetry device is used in automatic data collection and remote monitoring (ADCARM) systems.

Like most viable systems, automatic data collection and remote monitoring (ADCARM) systems prosper by providing vital services which cannot be economically duplicated by any other means. ADCARM systems are employed most advantageously in automating certain types of repetitious tasks. Since the switched public telephone communications system reaches almost every home in the United States, there is a natural symbiosis between ADCARM systems and that telephone system to share the resources of the already existing system infrastructure.

Moreover, to encourage cooperation with the telephone company, ADCARM service providers offer risk free revenue incentives to the telephone company by designing telemetry equipment which transparently overlays the existing telephone network, without modification and without any degradation in subscriber telephone service. Hence, when completely installed, some ADCARM systems require only access to the "test trunk" (an existing test port on the central office switch) while other configurations require absolutely no access to the central office facilities whatsoever. Consequently, in order capitalize upon the significant economic advantages gained by sharing the service resources of an already existing infrastructure, successful ADCARM service providers develop low cost telemetry devices which cannot interfere with the operation of the public telephone network. Compatibility is assured by designing subservient telemetry devices which relinquish control and automatically disengage themselves under all contention scenarios where a subscriber demands telephone system resources.

There are basically two types of ADCARM systems, called "dial inbound" and "dial outbound". The "dial outbound" system is most frequently employed in automatic meter reading (AMR) systems to collect utility meter readings from customer premises while the "dial inbound" systems are typically used with copy or vending machine monitors, in addition to AMR applications. The designations "inbound" and "outbound" refer to the method necessary to initiate a telemetry exchange with respect to the central control mechanism for the data system. Thus a "dial outbound" system requires a central data controller (CDC) unit to handshake with (ie. dial out to) a remotely located telemetry device, to trigger the telemetry exchange. Conversely, a "dial inbound" system is one which, according to our definition, "dials in" to the CDC unit under its own volition without requiring any initiating handshake. Most often, "outbound" telemetry units can be called at will since the CDC unit essentially "wakes" them up while "inbound" units, being self-activating, are only available for telemetry exchanges when they "call in" at a designated time. Dial inbound telemetry devices often incorporate real time clocks which can be reprogrammed by the CDC unit when they "dial in" at the appointed time. Despite these operational differences at the system level, the remotely located telemetry devices have very similar operating requirements.

Dial outbound telemetry devices are activated by sending an alerting signal to them while the subscriber telephone line is not being used. Since this signal is designed not to ring the telephone set, the user is unaware of the telemetry transaction. The telemetry device, however, upon reception of this alerting signal (typically a tone burst of specified frequency), seizes the phone line and completes the telemetry exchange. Access is made through the test trunk, itself part of the central office switch, to facilitate the transmission of this alerting signal to the outbound telemetry device without ringing the subscriber telephone. Therefore the procedure to collect telemetry data from the dial outbound telemetry unit is very straightforward but does require access to the test trunk at the central office facility. Because dial outbound telemetry devices incorporate an information signal detector (such as an alert signal detector) which is always anticipating the reception of an alerting signal, they are well suited to applications which require random collection of telemetry data since they can be called at will.

Because dial outbound devices require access to the test trunk, dial outbound telemetry systems are best suited to very large ADCARM systems which have a significant population of telemetry devices, at each central office switch, to justify the economic and political commitment. Just such an arrangement exists for utility companies since nearly every residence which has a telephone set almost certainly will purchase other metered commodities such as water, gas, and electricity. In fact, this arrangement is so natural that this form of dial outbound telemetry device has spawned an entire industry dedicated to automatically collecting utility meter readings. However, access to the test trunk, essential to the operation of dial outbound systems, also requires approval from the telephone company. If this cooperation is not forthcoming, dial inbound systems must be used.

Because dial inbound telemetry devices simply dial-in through the conventional telephone network to a host computer at a preprogrammed time, they require no access to any of the infrastructure of the telephone system itself. Like dial outbound systems, dial inbound systems are utilized in automatic meter reading (AMR) applications to collect utility meter readings from customer premises at a predetermined time. Additionally, dial inbound telemetry is well suited for applications which require routine or periodic telemetry exchanges. Some degree of flexibility is afforded to dial inbound units because the next "call-in" time for the telemetry device can be downloaded from the host as part of the telemetry exchange. Still, even with the ability to dynamically select the next "check-in" time, dial inbound devices are not well suited to applications requiring the random collection of telemetry data, because the device is inaccessible until it self-activates. It should be noted that dial inbound telemetry devices are essentially asleep until they are activated by input from a real time clock, or alarm input, whereas dial outbound units are always anticipating the reception of an alerting signal.

From the telephone subscriber's or user's perspective, both dial inbound telemetry devices and dial outbound telemetry devices are simply other devices which plug into the subscriber's telephone jack (in addition to the subscriber telephone set). Therefore such telemetry devices must not interfere with the operation of the telephone system. Consequently, while the subscriber's telephone set is in use, the dial inbound unit cannot be allowed to go off-hook whereby it would attempt to dial over an ongoing phone call. Moreover, it is also not desirable for the device to become active while the ring signal, intended to "ring" the subscriber telephone set, is present. Were the device to become active during such a ring signal, the device would erroneously "answer" an inbound phone call.

Because dial inbound telemetry devices only become active at a designated time (some can be activated by an alarm signal applied to special input terminals), it is preferable to view them from a slightly different perspective than dial outbound systems. Nevertheless, both dial inbound and outbound telemetry devices have similar requirements with respect to checking the status of the telephone line to which they are coupled. Stated alternatively, before a dial inbound telemetry unit becomes active in response to an activating signal from a real time clock (or an alarm signal), it must first ascertain the status of the subscriber telephone line. If that line is currently being activated by a ring signal or is currently in use by the subscriber, the dial inbound unit must wait until the line is again on-hook before it can begin its "dial in" procedure. ADCARM telemetry devices incorporate "line status indicator circuits" to provide these required supervisory functions.

Conventional line status indicators have employed a plurality of separate circuits to provide an indication of the line status. For example, such separate and distinct circuits within a prior line status indicator have included a high voltage detector responsive to the 90 volt AC ring signal, a "static off-hook detector" which would prevent the telemetry device from becoming active while the subscriber telephone set was in use, and a "dynamic off-hook detector" which would disengage the telemetry device should the telephone set be taken off-hook during a telemetry transmission. The terms "static" and "dynamic" refer to the state of the telemetry device (quiescent or active, respectively) when determining the status of the subscriber telephone line. For example, in an outbound telemetry device, the quiescent state or mode refers to state of the device as it awaits an alerting signal whereas the active state or mode refers to the state of the device once it has received an alerting signal which activates the device to transmit the data collected thereby.

Ring detector devices of the prior art often employ a separate AC coupled (capacitively coupled) circuit in conjunction with an optocoupler responsive to the high voltage 90 volt AC ring signal to detect that ring. For example, many contemporary answering machines use this approach. By selecting the appropriate coupling capacitance, an appropriate high AC voltage ring threshold voltage can be set.

At the present time, the most common application for ADCARM systems, both dial inbound and dial outbound, is in automatic meter reading (AMR) applications. The following is a brief discussion of the configuration of one conventional AMR system which demonstrates the basic structure and the elements of such a system. FIG. 1 shows a simplified block diagram of several residences 10, factories 15 and businesses 20 coupled via trunk lines 25 to a central office (CO) 30. At first glance, the operation of AMR systems may seem deceptively straightforward. However, the pragmatic aspects of designing the individual components within the system has been a major obstacle hindering the implementation of AMR systems. Of course, any AMR equipment placed at customer premises to be highly reliable, cost effective, and must not interfere with normal subscriber telephone service. It is only very recently that equipment capable of meeting the stringent requirements of this technology has become available.

As seen in FIG. 1, a typical AMR system uses the same telephone lines which provide normal subscriber telephone voice service without any alteration of telephone company equipment. When an AMR system is present on a subscriber's telephone line, there is no perceivable difference to the customer as to how the voice telephone system operates in comparison to an identical telephone system without AMR capability. In AMR systems, it is very desirable to have a minimal impact on the design of the existing telephone network.

FIG. 2 is a block diagram of the additional equipment required at the customer's premises (10, 15 or 20) to make the operation of the AMR system possible. To be non-intrusive with respect to the voice operation of the subscriber's phone line, the AMR equipment at the subscriber's premises simply "bridges" the existing telephone circuits. If properly designed, the AMR equipment will not negatively affect the operation of that telephone equipment.

As seen in FIG. 2, an MIU (meter interface unit) 35 is connected in parallel with the subscriber telephone line 25 at each remote site or customer premises. Connected in a similar parallel manner to the phone line are the telephone set 40 and other devices 45 which the customer might use such as answering machines, FAX telecopiers, computer modems and the like. For purposes of this discussion, one user device will not be distinguished from another and, in this context, a "telephone set" is used to mean any one of the user supplied devices.

It is again emphasized that the MIU connects to or bridges the phone line without adversely effecting the operation of the other devices on the line and that this property is not an inherent feature of the telephone network. While the user supplied devices (phone, fax, modem, etc.) are under the direct control of the consumer who provides them, the MIU is part of a network belonging to a utility company or utility meter agency which needs to collect utility use data. Since the MIU and the telephone set cannot function simultaneously on the same subscriber line, one or the other must have priority. Since the AMR system is automated and the telephone company will not tolerate any degradation in subscriber telephone service, the choice, by default, is that the user must have priority over any AMR function.

Attached to MIU 35 are one or more electronic registers 50 which are physically attached to the bodies of the utility meters 55. These registers can be read electronically by the MIU but may also have the same dials as their mechanical counterparts. These registers 50 serve to electronically collect the amount of metered commodity delivered to a customer, just as mechanical registers record such information mechanically with indicating dials. In most AMR systems, the electronic register converts the mechanical motion of a flow sensor into a serial format, similar to an RS-232 format, which can be electronically transferred when the device is interrogated in a prescribed manner. This minimizes the number of wires required to electrically interface the MIU to the electronic register. It is desireable, although not required, that the MIU be powered directly from the phone line without any reliance on external power sources. Dial inbound MIU's, however, can almost be totally line powered, if desired, except for a small battery required to avoid a power interruption of the real time clock which is an integral part of the design of an inbound MIU.

As seen in the block diagram of central office 30 in FIG. 3, a single central office site serves a plurality of remote users. Central office 30 includes a central office "switch" 60 having a plurality of ports. Phone lines 25 coming into the central office are essentially a bundle of wires which are connected to one or more of punch down blocks 65 at central office 30. From punch down blocks 65, the subscriber line pairs within the bundle are connected to central office switch 60. Each subscriber line has a known port on central office switch 60 which can be uniquely addressed by calling a specific telephone number.

As previously noted, only dial outbound telemetry devices require access to any hardware located at the central office facility. Remotely located telemetry devices of the dial inbound variety can be looked at as automatic telephones which just dial through the switched public telephone network into a host computer.

Associated with the central office switch 60 is a test trunk 67 which the telephone company uses to test subscriber lines attached to the switch 60. These tests help the service provider to ascertain the condition of any or all of the cable pairs attached to the switch, for maintenance purposes. Although most subscribers are unaware of such a function, the telephone company routinely checks the condition of the telephone line on a regular basis. Since these testing capabilities are an integral part of the central office switch design, the test trunk provides the required interface for a dial outbound AMR controller 70. By using the test trunk, dial outbound AMR controller 70 utilizes capabilities already incorporated into the switch by design, to minimize disruptions to subscriber service caused by activity on the test trunk. Thus test trunk 67 is the access point for dial outbound AMR controller 70 to selectively connect to a given MIU on a particular subscriber's phone line. Part of the AMR function is to maintain a table of "phone" numbers which can be "dialed" on the test trunk thereby providing connectivity to the desired MIU device or devices.

BRIEF SUMMARY OF THE INVENTION

One object of the present invention is to provide a signal processing circuit which determines the status of a telephone line, namely, whether the phone line is available or not available.

Another object of the invention is to provide a signal processing circuit which detects when a communications device on the phone line is off-hook to indicate that the phone line is not available.

A further object of the present invention is to provide a signal processing circuit which detects when the phone line is ringing to indicate that the phone line is not available.

Still another object of the present invention is to provide a signal processing circuit which prevents analog phone line signals from being supplied to the alert detector of a telemetry device such as an MIU when it is determined that the phone line is not available.

Yet another object of the present invention is to provide a signal processing circuit in which the ring detector and off-hook detector are integral to minimize the parts count in the signal processing circuit.

Still another object of the present invention is to provide a signal processing circuit which does not interfere with the normal operation a phone line coupled thereto.

Another object of the invention is to provide a signal processing circuit which is DC coupled to the phone line and which operates at DC threshold voltage levels substantially less than the high voltage AC levels often associated with the high voltage ring signal.

In accordance with the present invention, a signal processing circuit is provided for use with an inbound telemetry device which is couplable to a phone line. Such phone line includes a positive line and a negative line exhibiting a phone line voltage therebetween. At least one other communications device is couplable to the phone line. The signal processing circuit includes a first input for coupling to the positive line and a second input for coupling to the negative line. A positive supply path is coupled to the first input and a negative supply path is coupled to the second input. The circuit includes a transistor which is coupled to the positive and negative supply paths. The transistor generates an output signal exhibiting a first state when the phone line voltage is greater than a predetermined threshold voltage to indicate that the phone line is available for use by the inbound telemetry device. The output signal assumes a second state when the phone line voltage is less than the predetermined threshold voltage to indicate that the phone line is not available for use by the inbound telemetry device. The signal processing circuit includes a first isolating circuit coupled between the transistor and the positive supply path for preventing the transistor from drawing substantial current from the phone line. The signal processing circuit further includes a second isolating circuit situated in the negative supply path for preventing the signal processing circuit from drawing substantial current from the phone line. A power supply means is coupled between the positive supply path and the negative supply path. The power supply includes an output port. The power supply derives sufficient power from the phone line to supply operating power to the output port for use by an inbound telemetry device.

Another embodiment of the signal processing circuit of the invention is provided for use with an outbound telemetry device which is couplable to a phone line. Such phone line includes a positive line and a negative line exhibiting a phone line voltage therebetween. The phone line is capable of communicating information signals thereon. At least one other communications device is couplable to the phone line. The processing circuit includes a first input for coupling to the positive line and a second input for coupling to the negative line.

The circuit further includes a positive supply path coupled to the first input and a negative supply path coupled to the second input. The signal processing circuit includes first and second transistors, each including an emitter, base and collector. The first and second transistors are coupled together in a totem-pole arrangement between the positive and negative supply paths, the collector of the first transistor being coupled to the positive supply path, the emitter of the second transistor being coupled to the negative supply path. The circuit further includes a limiter coupled to the collector of the first transistor such that the first transistor together with the limiter form an analog to digital converter for supplying a digital representation of information signals from the phone line to a signal output as a converted signal. The second transistor is biased to turn on when the phone line voltage is greater than a predetermined threshold voltage and in response thereto the first transistor turns on such that the converted signal is supplied to the signal output. The second transistor is biased to turn off when the phone line voltage is less than a predetermined threshold voltage and in response thereto the first transistor turns off such that no converted signal is provided to the signal output. The circuit further includes a first isolating circuit coupled between the first transistor and the positive supply path for preventing the first transistor from drawing substantial current from the phone line. The circuit also includes a second isolating circuit situated in the negative supply path for preventing the signal processing circuit from drawing substantial current from the phone line. The signal processing circuit includes a power supply, coupled between the positive supply path and the negative supply path and including an output port, for deriving sufficient power from the phone line to supply operating power to the output port for use by an outbound telemetry device.

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

The present invention involves a signal processing apparatus which is intended for use in an outbound telemetry device or an inbound telemetry device. Thus, respective outbound and inbound embodiments of the signal processing apparatus of the invention are subsequently described herein. More particularly, the signal processing apparatus which is intended for use in an outbound telemetry device is referred to as the outbound signal processing apparatus. The signal processing apparatus which is intended for use in an inbound telemetry device is referred to as the inbound signal processing apparatus.

Both the outbound and inbound signal processing apparatuses prevent the telemetry devices in which they are respectively employed from being inadvertently activated by message content on a subscriber line when that line is in use. Moreover, the inbound signal processing apparatus prevents the telemetry device from being activated by a ring signal sent by the central office switch to "ring" a customer telephone set. The signal processing apparatus of the invention is advantageously employed in conjunction with telephone line powered telemetry devices, although the invention could be employed in conjunction with non-telephone line powered telemetry devices as well.

For purposes of this application, the term "high voltage" is used to mean the relatively high AC voltage levels associated with telephone ringing signals. Such high voltage ringing signals generally exhibit an AC voltage substantially in excess of the nominal DC line voltage in typical telephone systems.

I. OUTBOUND SIGNAL PROCESSING APPARATUS—GENERAL

Figure 1:
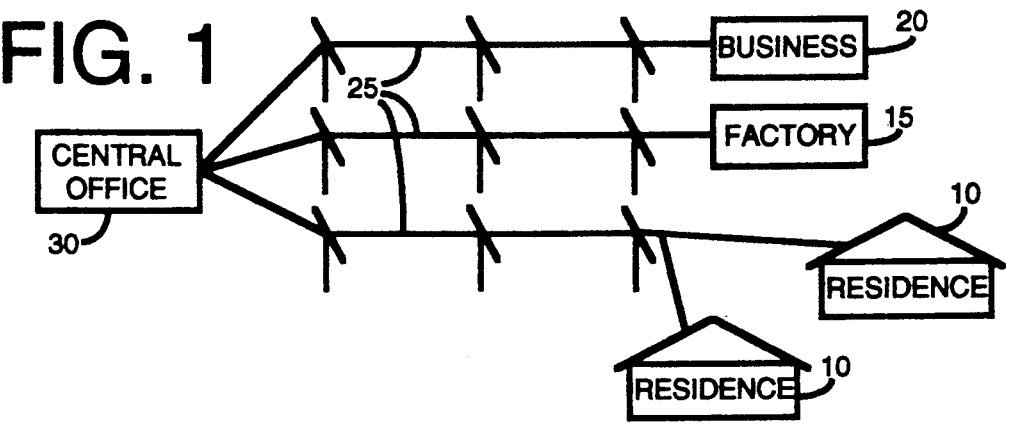
FIG. 1 is a representation of a typical conventional telephone system.
Figure 2:
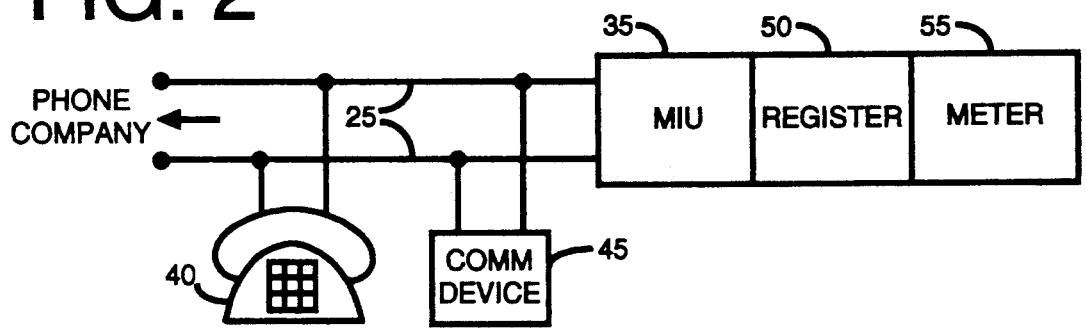
FIG. 2 is a block diagram showing the installation of a conventional meter interface unit at a telephone subscriber's cite.
Figure 3:
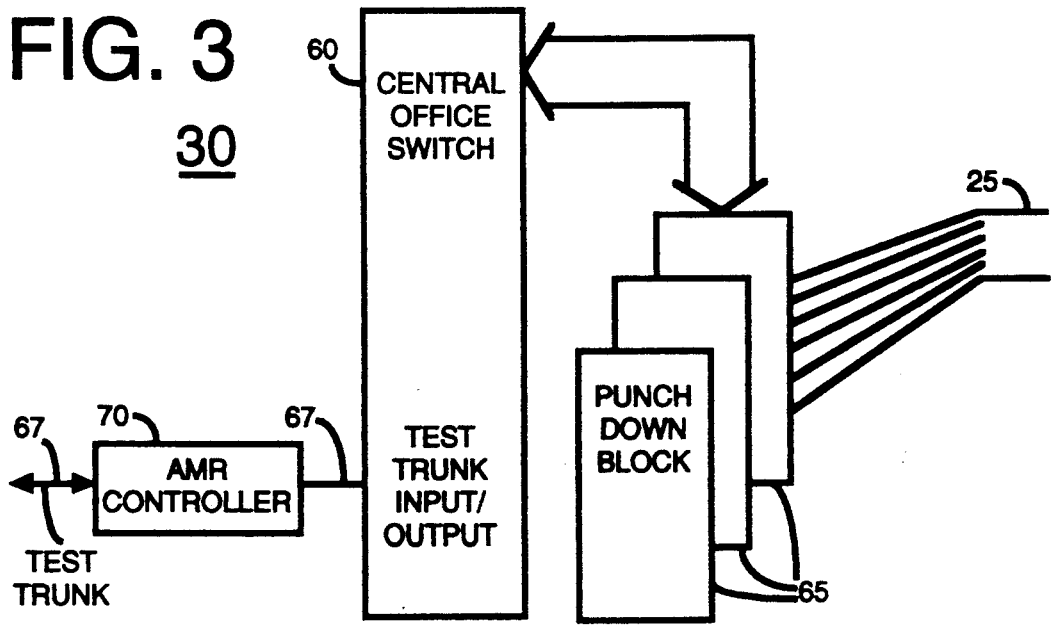
FIG. 3 is a block diagram of typical switching equipment at the central office of the telephone company which is coupled to the phone lines.
Figure 4:
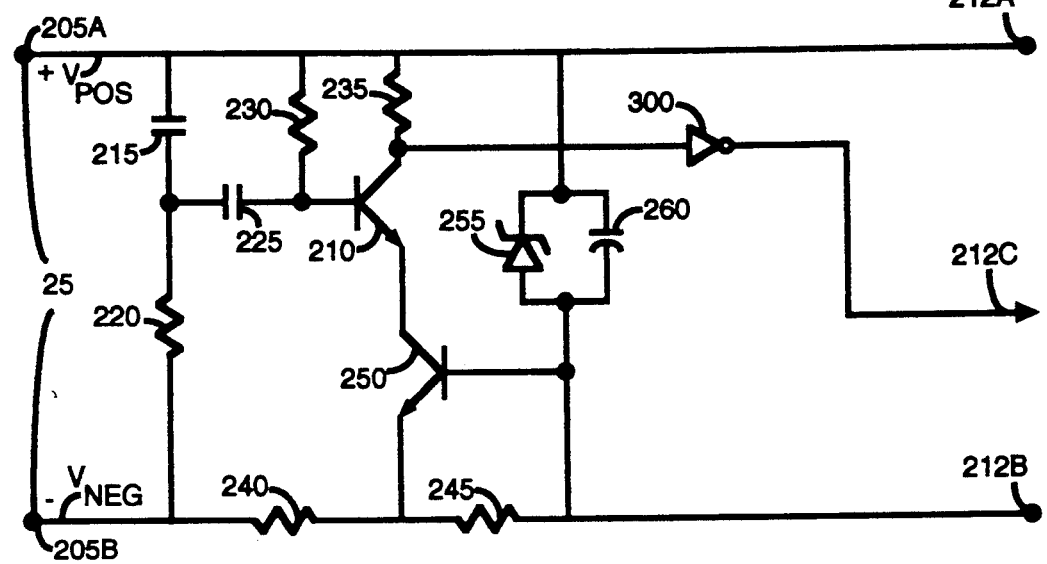
FIG. 4 is a schematic diagram of the signal processing circuit of the present invention, such circuit being intended for use in an outbound telemetry device.

FIG. 4 shows an embodiment of the outbound signal processing apparatus of the invention for use in an outbound telemetry device (not shown). This signal processor is designated as signal processing circuit 200. The topology of processing circuit 200 is discussed immediately below followed by a discussion of the operation of such circuit.

Signal processing circuit 200 includes an input port formed by input terminals 205A and 205B which are coupled to the positive and negative wires of phone line 25 respectively. The line voltages appearing at input terminals 205A and 205B are designated as $V_{POS}$ and $V_{NEG}$, respectively. Telephone line 25 is coupled to the central office of the telephone company as described earlier such that alerting signals can be provided to circuit 200. These alerting signals are processed by circuit 200 and are then passed on to the remaining circuitry of the outbound telemetry device such as a meter interface unit (MIU), for example, which is shown later.

Circuit 200 further includes a transistor 210 which acts as an amplifier-limiter to convert the analog signals present on phone line 25 to a digital signal which can be processed by the digital tone detector circuits which are found in certain outbound telemetry devices such as some MIU's, as will be discussed later in more detail. An example of one such MIU in which signal processing circuit 200 may be employed is the MIU disclosed and claimed in my copending patent application entitled OUTBOUND TELEMETRY DEVICE, filed concurrently herewith, the disclosure of which is incorporated herein by reference.

Circuit 200 includes outputs 212A and 212B which are positive and negative output terminals, respectively, at which an telemetry device (MIU) bias voltage is generated as will be explained subsequently. Input 205A is coupled to output 212A.

A capacitor 215 is series coupled with a resistor 220 at the input of circuit 200. More specifically, the capacitor 215/resistor 220 combination is coupled in parallel with input terminals 205A and 205B as shown in FIG. 4. In the particular embodiment depicted in FIG. 4, transistor 210 is an NPN transistor, the base of which is coupled via a capacitor 225 to the juncture of capacitor 215 and resistor 220. The base of transistor 210 is also coupled to input 205A and the voltage $V_{POS}$ via a resistor 230. The collector of transistor 210 is coupled via a bias or pull-up resistor 235 to input 205A and the voltage $V_{POS}$ via a resistor 230.

Resistors 240 and 245 are series coupled between input 205B and output 212B as seen in FIG. 4. A transistor 250 is coupled to the emitter of transistor 210 to act as an active load for transistor 210 as described later in more detail. Transistors 210 and 250 are coupled together in a totem-pole arrangement as depicted in FIG. 4. In this particular embodiment, transistor 250 is an NPN transistor, the collector of which is coupled to the emitter of transistor 210. The emitter of transistor 250 is coupled to the juncture of resistor 240 and resistor 245.

A zener diode 255 is coupled in parallel with output terminals 212A and 212B to regulate the bias voltage present thereat. More specifically, the cathode of zener diode 255 is coupled to output terminal 212A and the anode of zener diode 255 is coupled to the base of transistor 250 as well as to output terminal 212B. A capacitor 260 is coupled in parallel with diode 255.

Transistor 210 acts as an amplifier-limiter to convert the analog input signal on phone line 25 to a digital signal used by the alert signal detector in the meter interface unit of my copending patent application METER INTERFACE UNIT or other outbound telemetry device.

Transistor 250 acts as an emitter load for the amplifier 210. Transistor 250, however, also acts as a voltage sensitive bias network and will turn off if at any time the voltage across the phone line input terminals 205A and 205B drops below a predetermined threshold voltage (turn-off point) which is significantly less than the nominal phone line voltage. It is noted that typically the nominal voltage across phone line input terminals 205A and 205B from phone line 25 is approximately 48 volts in the "on-hook" condition. When the voltage across phone line inputs 205A and 205B drops below the 48 volt nominal line voltage to below a lesser predetermined threshold voltage such as 35 volts, this typically indicates that telephone line 25 is not available because another communications device on line 25 is "off-hook". When transistor 250 turns off, then the voltage at the collector of transistor 250 goes high.

Resistor 245 in conjunction with resistor 240, sets the turn-off point for the amplifier network formed by transistors 210 and 250. In this particular embodiment of the invention wherein the particular turn-off point is selected to be 35 volts, suitable values for resistors 240 and 245 are 6.2M ohms and 110K ohms, respectively. Those skilled in the art will appreciate that these resistance values will vary somewhat depending on the particular turn-off point or threshold voltage chosen for the signal processing apparatus. The resistance of resistor 240 is selected to substantially isolate signal processing circuit 200 from phone line 25 in terms of the amount of current drawn therefrom, as will be discussed later in more detail in the description of the inbound embodiment of the invention. Suffice it to say for now that the resistance of resistor 240 is selected to be a very high resistance which prevents circuit 200 from drawing substantial current from phone line 25. Pull-up resistor 235 between the collector of transistor 210 and positive input 205A exhibits a very high resistance to prevent transistors 210 and 250 from drawing substantial current from phone line 25. Therefor, resistor 235 acts to isolate transistors 210 and 250 from phone line 25 in terms of the amount of current drawn therefrom such that transistor 210 and 250 do not substantially load down the phone line.

It is noted that the predetermined threshold voltage or turn-off point of signal processing circuit 200 is selected to be substantially less than the nominal phone line voltage. In other words, the predetermined threshold voltage is selected to be sufficiently less than the nominal phone line voltage to permit the circuit to distinguish the line voltage level associated with the on-hook condition from the line voltage level associated with the off-hook condition.

Inverter 300 helps limit or square up the amplified signal from the analog first stage formed by transistors 210 and 250. In this manner, Schmitt inverter 300 assists digital to analog converter amplifier 210 in the conversion of the analog signal on phone line 25 to a digital equivalent thereof at the output of Schmitt inverter 300.

And finally, zener diode 255 and the associated filter capacitor 260 act as a voltage clamp, regulator and power supply for the quiescent mode of the MIU or other outbound telemetry device with which signal processing circuit 200 is employed. It will be recalled that the quiescent mode of the MIU or other outbound telemetry device refers to the standby mode of such device when it is waiting to receive an alerting signal.

Before beginning the detailed description of the operation of signal processing circuit 200 of FIG. 4, initial conditions for the circuit are first established. In this particular embodiment, it is initially assumed that the outbound telemetry device and circuit 200 reside on a telephone line which is not in use and which has not been called for at least a period of approximately ten seconds. These are the normal operating conditions for a subscriber phone line since it is assumed that the customer originates or receives calls relatively infrequently. Under these conditions, a voltage greater than 35 volts appears at the input terminals 205A and 205B of the circuit 200, such that zener diode 255 acts as a low current voltage regulator to establish a quiescent bias voltage across output terminals 212A and 212B for the MIU or other outbound telemetry device circuitry thereto. At these very low zener currents, zener diode 255 is not in the zener region but it is close to the zener region on the knee of the zener characteristic, and will provide regulation down to phone line voltage levels well below the 35 volts present across the input terminals of circuit 200.

Speaking in general terms, the outbound signal processing circuit 200 of the present invention converts the analog information signals on phone line 25 to digital information signals via the action of transistor amplifier 210 and inverter 300. As will now be discussed in detail, signal processing circuit 200 includes circuitry for sensing and testing if phone line is not available due to another communications device on the line being "off hook". If the communications device is determined to be "off hook", then signal processing circuit 200 will not permit information signals (such as alert signals) from the phone line to be transmitted to the information signal detector (such as the alert signal detector) of the outbound telemetry device in which circuit 200 is employed.

II. OUTBOUND SIGNAL PROCESSING APPARATUS —DETAILED OPERATION; ON HOOK CONDITION

At phone line voltage levels of 35 volts or greater across input terminals 205A and 205B, the "leakage current" flowing through resistors 240 and 245 is sufficient to develop a 0.6 volts drop across resistor 245 and thus transistor 250 is biased on. Under these circumstances, the first stage formed by transistors 250 and 210 will be biased as an amplifier. Transistor 250 acts as an active load for transistor 210. Transistor 210 amplifies the AC coupled signal, that is, the alerting signal from the phone line, applied to the base of transistor 210. Since resistor 235 has a typical value in excess of 5MΩ there will be appreciable gain at the collector of 210 which is then buffered and limited (squared up) by inverter 300.

In this mode of operation where phone line 25 is determined to be available, any signal which appears on the input terminals 205A and 205B of circuit 200 is amplified, limited and is then presented to an alert signal detector (not shown) coupled to output 212C. Such an alert signal detector is contained within the telemetry device circuitry coupled to circuit 200 as will be shown in a later example. When an appropriate alert signal intended for the subject telemetry device (MIU) is present on phone line 25, the telemetry device circuitry coupled to circuit 200 will be powered into the second active mode previously described in which such device gathers and transmits data over phone line 25.

III. OUTBOUND SIGNAL PROCESSING APPARATUS —DETAILED OPERATION; OFF HOOK CONDITION

If a subscriber telephone set or other communications device (not shown) coupled to phone line 25 is lifted off-hook, then the voltage appearing at the input terminals 205A and 205B of the signal processing circuit 200 will drop below 35 volts, the predetermined turn-off point or trip point (DC threshold voltage). When this occurs there will not be enough voltage drop across resistor 245 to forward bias the base-emitter junction of 250 and consequently transistor 250 will turn off. With transistor 250 turned off, the emitter of transistor 210 is pulled to a logic high and transistor 210 turns off. With transistors 250 and 210 both off, the input of inverter 300 is pulled to a logic high by resistor 235. The output of inverter 300 goes to a logic low and all input ceases to an alert signal detector coupled to the output of inverter 300, namely output terminal 212C.

In this manner, all input to an alert signal detector of an MIU or other telemetry device coupled to circuit 200 at output 212C is effectively blocked when the voltage on the subscriber phone line falls below 35 volts, which indicates that a user device on the phone line is "off hook" and that the line is now in use and not available.

It is important to realize that in the above circumstances, even though the analog first stage formed by transistors 210 and 250 has been turned off and the signal path to the alert detector in the MIU has been blocked, the voltage regulator (zener diode 255) will remain operative until the phone line voltage across input terminals 205A and 205B has dropped well below the 35 volt trip point.

Thus, when the telephone line voltage drops below the 35 volt trip level, circuit 200 determines that the telephone line is not available due to a communications device being off-hook. When circuit 200 senses this off-hook condition, a telemetry device such as an MIU coupled to signal processing apparatus 200 is prevented from being falsely activated by any ongoing voice communication on the phone line.

IV. OUTBOUND SIGNAL PROCESSING APPARATUS —COMBINED WITH OUTBOUND TELEMETRY DEVICE

Figure 5:
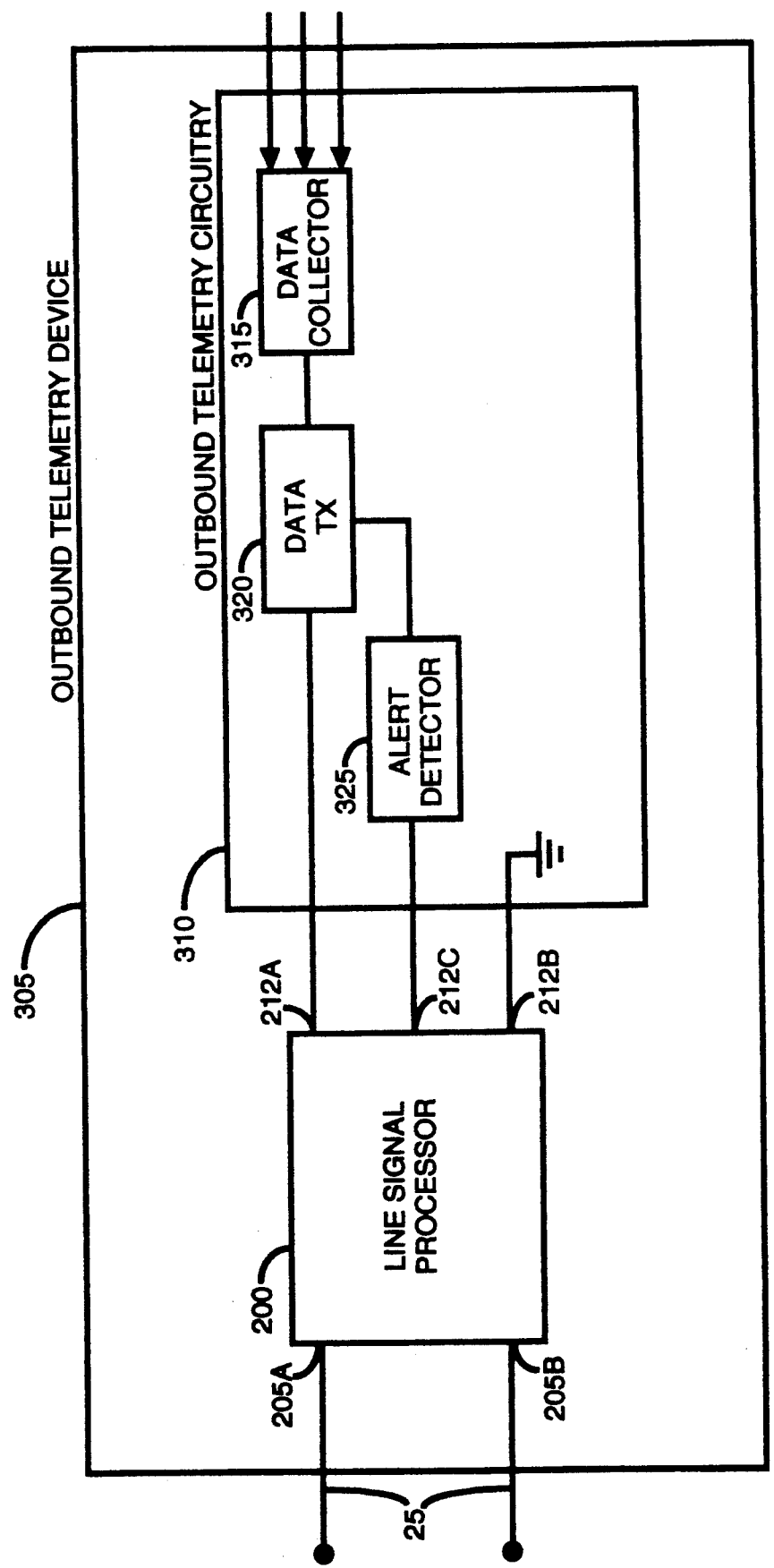
FIG. 5 is a block diagram of an outbound telemetry device in which the signal processing circuit of FIG. 4 may be employed.

As mentioned earlier, processing circuit 200 is typically employed in an outbound telemetry device such as an MIU to pre-process and condition signals on phone line 25 prior to application of such signals to remaining outbound device circuitry in an outbound telemetry device. More specifically, FIG. 5 shows an example of signal processing circuit 200 coupled to other outbound device circuitry 310 in an outbound telemetry device 305. Outbound device 305 includes a data collector 315 which collects data from one or more inputs, such data collector being coupled to a data transmitter 320. Processor output 212C is coupled to an alert signal detector 325 which is capable of detecting the presence of the alert signal. Data transmitter 320 is coupled to output 212A of processing circuit 200 such that collected data can be transmitted from outbound device 305 over phone lines 25 when alert signal detector 325 detects the presence of an alert signal.

In this arrangement, alert signal detector 325 of outbound device 305 is blocked from receiving any signals which might cause falsing when the phone line is determined to be not available due to another communications device on the phone line being "off hook" (in use). It is noted that in one embodiment, circuit 200 and outbound device 310 are combined or integrated together in the same enclosure. In this instance, the combined processing circuit/outbound telemetry device may be referred to as an outbound telemetry device or an MIU, for convenience, as appropriate.

V. INBOUND SIGNAL PROCESSING APPARATUS—GENERAL

While the signal processing circuit embodiment 200 shown in FIG. 4 performs well in dial outbound MIU devices, the typical dial inbound telemetry device cannot be activated by placing an alerting signal on the input terminals of such inbound telemetry device. Since the amplifier 210 and limiter 300 components of circuit 200 would be extraneous in such inbound telemetry device applications, an embodiment of the invention is contemplated wherein such components are eliminated.

Figure 6:
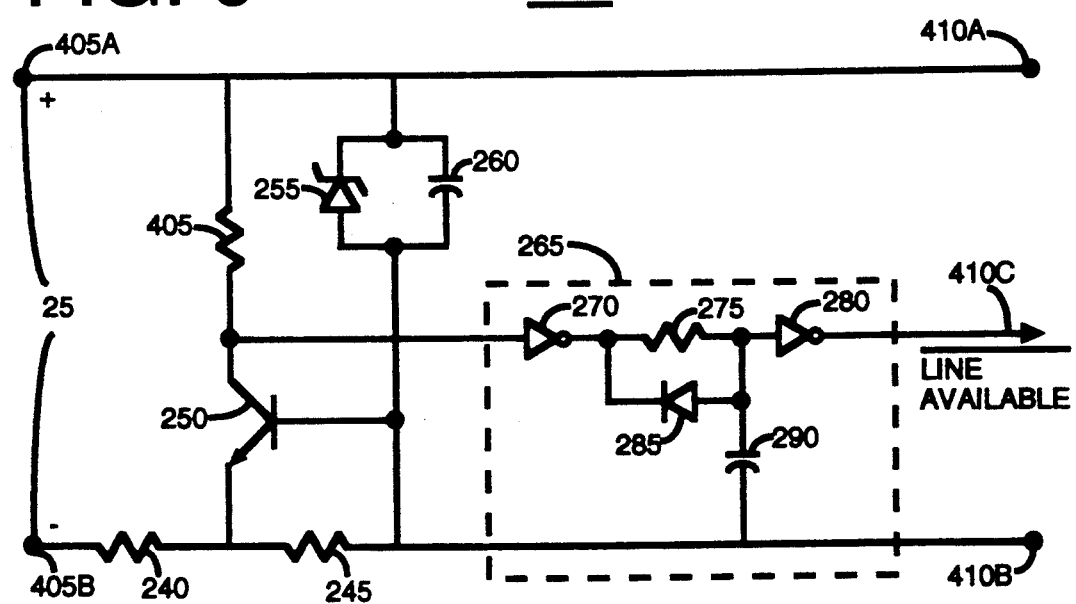
FIG. 6 is a schematic diagram of another embodiment of the signal processing circuit of the present invention, such circuit being intended for use in an inbound telemetry device.

More specifically, such an embodiment of a signal processing circuit for use in an inbound telemetry device is shown in FIG. 6 as processing circuit 400. By replacing the following components—resistor 230, resistor 235 and transistor 210 of circuit 200 with a single resistor 405, and by adding "ring detector" circuit 265, processing circuit 400 is fabricated. In one embodiment of the invention, resistor 405 has a very high resistance value, for example, 5 Mohms has been found to be suitable. In comparing inbound signal processing circuit 400 of FIG. 6 with outbound signal processing circuit 200 of FIG. 4, it is noted that like numerals are used in the drawings to indicate like elements.

Processing circuit 400 includes phone line inputs 400A and 400B which are coupled in parallel with the subscriber phone line in a manner similar to that of inputs 200A and 200B of circuit 200 of FIG. 4. Processing circuit 400 further includes bias voltage outputs 410A and 410B which correspond substantially to the bias voltage outputs 212A and 212B of circuit 200. This processing circuit 400 of FIG. 6 is effectively a "line available" indicator which generates a /LINE AVAILABLE signal at output 410C. In the inbound scenario, the phone line may be unavailable for two different reasons, namely, a communications device on the phone line is "off hook" or the phone line is ringing.

When the /LINE AVAILABLE signal is high, this indicates that line 25 is not available, that is, either line 25 is ringing or is otherwise in use (communications device off-hook). When the /LINE AVAILABLE signal is low, this indicates that line 25 is available such that an inbound telemetry device coupled to processing circuit 400 should be free to transmit its data over the phone line.

As in signal processing circuit 200 of FIG. 4, transistor 250 of signal processing circuit 400 of FIG. 6 provides an indication of whether the phone line is in the off-hook condition or the on-hook condition by monitoring the phone line voltage to determine when the phone line voltage drops below a predetermined threshold voltage. It is noted that the predetermined threshold voltage or turn-off point of signal processing circuit 400 is selected to be substantially less than the nominal phone line voltage. In other words, the predetermined threshold voltage is selected to be sufficiently less than the nominal phone line voltage to permit the circuit to distinguish the line voltage level associated with the on-hook condition from the line voltage level associated with the off-hook condition.

I. INBOUND SIGNAL PROCESSING APPARATUS—RING TIMER

A ring timer circuit 265 is coupled to the emitter of transistor 210 and the collector of transistor 250 as shown in FIG. 4. In one particular embodiment of the invention, ring timer circuit 265 includes a Schmitt inverter 270, the input of which is coupled to the collector of transistor 250. The output of Schmitt inverter 270 is coupled via a resistor 275 of value $R_{RT}$ to the input of a Schmitt inverter 280. A diode 285 is coupled in parallel with resistor 275 such that the cathode of diode 285 is coupled to the output of Schmitt inverter 270 while the anode of diode 285 is coupled to the input of Schmitt inverter 280. The input of Schmitt inverter 280 is coupled to the output terminal 410B of signal processing circuit 400 via a capacitor 290 of value $C_{RT}$. Resistor 275 and capacitor 290 form an RC circuit, the operation of which will be discussed in more detail later. The output of Schmitt inverter 280 is coupled to /LINE AVAILABLE output 410C.

Before entering into a detailed description of the operation of circuit 400, a brief discussion of the function of the components of circuit 400 follows. Ring timer circuit 265 is a retriggerable timer with a reset time interval determined by an R-C time constant selected by the component values $R_{RT}$ of resistor 275 and $C_{RT}$ of capacitor 290. The reset time interval is typically set to be greater than the time interval between telephone "rings", that is, the "inter-ring" interval. For example, nominally this reset time interval is set to be greater than 4 seconds (the typical inter-ring interval between telephone "rings"). The diode 285 across resistor 275 ($R_{RT}$) assures that capacitor C290 ($C_{RT}$) is rapidly discharged when the ring signal starts, assuring that timer 265 can be accurately retriggered. In one embodiment of the invention, a value of 1 Mohm for resistor 275 ($R_{RT}$) and a value of 5.6 uF for capacitor C290 ($C_{RT}$) were found to be satisfactory.

As will be discussed later, Schmitt trigger 270 is used to trigger the ring timer 265 when the 90 volt sinusoidal ring signal on phone line 25 momentarily swings below the 35 volt input threshold and shuts off transistor 250.

VII. INBOUND SIGNAL PROCESSING APPARATUS —LINE AVAILABLE (NEITHER "OFF-HOOK" NOR RINGING)

Starting with initial conditions similar to those presented in the discussion of the outbound embodiment, the operation of inbound signal processing apparatus 400 is now discussed. It is initially assumed that the inbound telemetry device and circuit 400 reside on a telephone line which is not in use and which has not been called for at least a period of approximately ten seconds. These are the normal operating conditions for a subscriber phone line since it is assumed that the customer originates or receives calls relatively infrequently.

In a manner similar to the outbound circuit of FIG. 4, when no other communications device on the phone line 25 is off-hook and when phone line 25 is not ringing, the nominal phone line voltage (48 volts) across terminals 405A and 405B is sufficient to bias transistor 250 on. That is, under these conditions, the voltage supplied across terminals 405A and 405B is greater than the predetermined threshold voltage (35 volts, for example) at which transistor 250 turns on. When transistor 250 is turned on in this manner, the collector voltage of transistor 250 goes low such that the output voltage of inverter 270 goes high. This causes capacitor 290 to become fully charged up to a voltage greater than the trigger point of inverter 280 such that the output of inverter 280 goes low, that is, the /LINE AVAILABLE signal at output 410C goes low.

Thus, when inbound signal processing apparatus 400 detects no communications device as being off-hook and further detects no ringing on the phone line, then signal processing circuit 400 generates a /LINE AVAILABLE signal exhibiting a logical low (0) at output 410C. This apprises inbound telemetry device circuitry (not shown) which is coupled to output 410C that the phone line is available for use by such telemetry device.

In a manner similar to the outbound embodiment of FIG. 4, inbound signal processing apparatus 400 provides bias voltage at terminals 410A and 410B for a telemetry device with which apparatus 400 is used through the action of zener diode 255 and filter capacitor 260.

VIII. INBOUND SIGNAL PROCESSING APPARATUS —LINE NOT AVAILABLE (COMMUNICATION DEVICE IS "OFF HOOK")

Starting with the same initial conditions discussed above, it is now assumed that a communications device on phone line 25 comes off-hook. When this occurs, the phone line voltage drops below the predetermined threshold voltage (35 volts) and transistor 250 loses bias and turns off.

At all times, a majority of the current drawn from phone line 25 flows through the loop formed by resistors 240, 245 and zener diode 255. The values of resistors 240 and 245 are selected such that when the phone line voltage drops below a predetermined threshold voltage established by such resistances (for example, the aforementioned 35 volts), then transistor 250 turns off. Under these circumstances, the current through resistor 245 is not sufficient to forward bias the base emitter junction of transistor 250 and keep transistor 250 active.

With transistor 250 thus turned off, the collector voltage of transistor 250 goes high and the voltage on the output of inverter 270 goes low. When the output of inverter 270 goes low, the voltage on capacitor 290 is discharged such that the trigger point voltage of inverter 280 is not reached. The output of inverter 280 then goes high causing the /LINE AVAILABLE signal to go to a logic high (1).

Thus, when inbound signal processing apparatus 400 detects a communications device as being off-hook, signal processing circuit 400 generates a /LINE AVAILABLE signal exhibiting a logical low (1) at output 410C. This apprises inbound telemetry device circuitry (not shown) which is coupled to output 410C that the phone line is not available for use by such telemetry device.

It is noted that even though a communications device has been detected as being off-hook by virtue of the phone line voltage being below the predetermined threshold, zener diode 255 and filter 260 continue to supply bias voltage at terminals 410A and 410B for use by an inbound telemetry device. The voltage developed across zener diode 255 biases the very low power inbound telemetry device circuitry (not shown) which is couplable to output terminals 410A and 410B. Resistor 240 is selected such that signal processing apparatus 400 draws a very low quiescent operating current (leakage current) from the phone line. The phone company requires that any device coupled to the phone line exhibit a very high resistance of typically 10 Mohms when such device is in the on-hook condition. The resistance of resistor 240 is selected to be a very high resistance so as to substantially isolate circuit 200 from the phone line such that circuit 400 does not draw substantial current from the phone line.

It is noted that due to the very high resistance of collector resistor 405 which is typically 5 Mohms, the collector current associated with transistor 250 is very small. Thus transistor 250 draws negligible current or insubstantial current from phone line 25 and, as stated earlier, most of the current drawn from the phone line flows through the above described current loop.

In this manner, signal processing circuit 400 provides both a bias voltage supply for an inbound telemetry device and a detector for determining when a communications device is off-hook.

IX. INBOUND SIGNAL PROCESSING APPARATUS —LINE NOT AVAILABLE (PHONE LINE IS RINGING)

Again with the same initial conditions discussed above, it is now assumed that a ring signals appears on phone line 25. When the central office "rings" phone line 25, signal processing circuit 400 typically sees a 90 volt sinusoidal ring signal across its input terminals 405A and 405B. The ring signal is typically a two second sinusoidal burst followed by a four second inter-ring pause during which normal tip and ring bias keeps the processing circuit 400 and the MIU coupled thereto quiescently biased. When the sinusoidal ring signal momentarily swings below the aforementioned 35 volt predetermined threshold, transistor 250 turns off and its collector is pulled to a logic high level. Consequently, the output of Schmitt inverter 270 goes to a logic low immediately draining the charge from capacitor 290 ($C_{RT}$), because the diode 285 across resistor 275 ($R_{RT}$) conducts. Schmitt inverter 280 generates a /LINE AVAILABLE signal exhibiting a logic high (1) signal at output 410C indicating that the phone line is not available, that is, the phone line is ringing.

The time constant provided by resistors 240, 245 and the filter capacitor 260 across zener diode 255, assures that the MIU quiescent bias voltage (ie. the voltage between output terminals 410A and 410B) remains essentially constant while the ring signal is applied. During the ring burst, capacitor 290 ($C_{RT}$) is discharged repeatedly as the sinusoidal ring signal troughs below the threshold voltage. Following the two second ring burst, capacitor 290 ($C_{RT}$) will begin charging to a positive voltage through resistor 275 ($R_{RT}$) and will eventually rise above the threshold of Schmitt inverter 280, thereby sending the /LINE AVAILABLE signal to logic low (0) after the ringing has stopped for a sufficiently long period of time. This indicates that ringing has stopped and that the phone line is now available for use by a telemetry device coupled to the phone line.

The time it takes capacitor 290 ($C_{RT}$) to charge to the threshold or trigger level of inverter 280 is determined by the R-C time constant and is selected to be greater than the 4 second inter-ring interval or greater than whatever the inter-ring time interval is for a particular system. Unless the ring signal disappears for a time period greater than the inter-ring interval, capacitor 290 will never charge to the threshold level of Schmitt inverter 290 since the recurrent ring burst will instantaneously remove the charge accumulated between the pauses. Therefore, an output signal at output 410C indicating that the phone line is available is not possible unless the ring signal has been totally discontinued. Hence, while a ring signal is present on phone line 25, an MIU or other outbound telemetry device coupled to output 410C informed that the phone line is not available.

Thus, in summary, when inbound signal processing apparatus 400 detects a ring signal on phone line 25, then signal processing circuit 400 generates a /LINE AVAILABLE signal exhibiting a logical high (1) at output 410C. This apprises inbound telemetry device circuitry (not shown) which is coupled to output 410C that the phone line is not available for use by such telemetry device. However, when ringing ceases for a period of time more than a predetermined period of time greater than the inter-ring interval, then signal processing apparatus 400 generates a LINE AVAIL- ABLE signal exhibiting a logical high (0) at output 410C indicating that the phone line is available, provided that apparatus 400 does not detect that a communications device is off-hook. In other words, signal processing apparatus 400 will not generate a /LINE AVAILABLE signal of logical (0) indicating that phone line is available unless two conditions are true, namely, that no other communications device on the phone line is off-hook and that the phone line is not ringing.

In summary, it will be appreciated that signal processing circuit 400 provides a bias voltage supply for an inbound telemetry device, a detector for determining when a communications device is off-hook and a detector for determining when the phone line is ringing.

X. INBOUND SIGNAL PROCESSING APPARATUS —COMBINED WITH INBOUND TELEMETRY DEVICE

Figure 7:
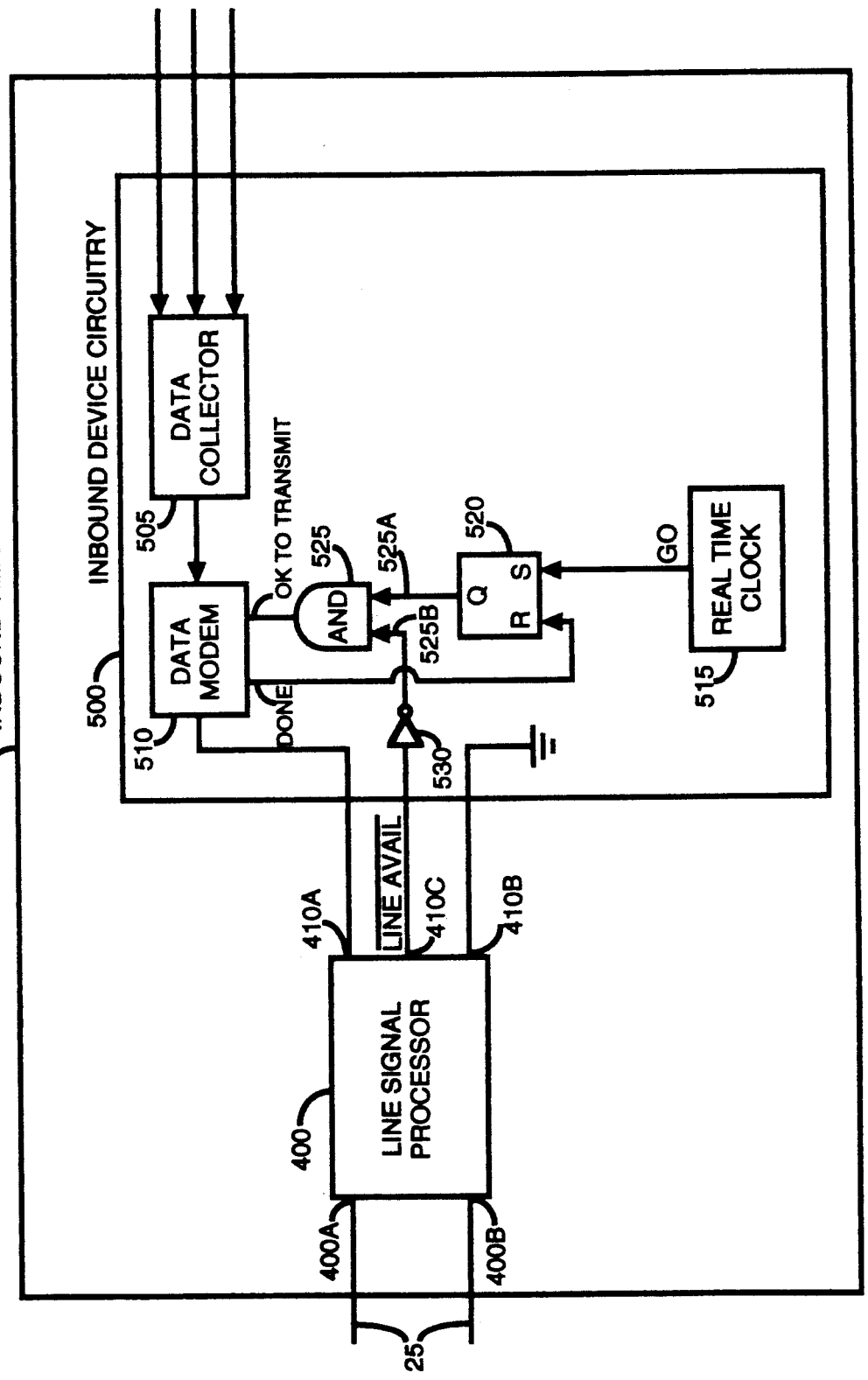
FIG. 7 is a block diagram of an inbound telemetry device in which the signal processing circuit of FIG. 6 may be employed.

As indicated earlier, processing circuit 400 is employed in an inbound telemetry device such as an inbound MIU to pre-process and condition signals on phone line 25 prior to application of such signals to the remaining circuitry in the inbound telemetry device. More specifically, FIG. 7 shows an example of processing circuit 400 coupled to inbound device circuitry 500 within an inbound telemetry device 502. Inbound device 502 includes a data collector 505 which collects data from one or more inputs, such data collector being coupled to a data modem 510. Inbound device 500 includes a real time clock 515 or other alarm which generates a GO signal at a predetermined time or upon the occurrence of a particular event. The generation of such GO signal indicates that it is time for data modem 510 to transmit the data collected by data collector 505 over phone line 25, providing that phone line 25 is available.

The GO signal from real time clock 515 is supplied to a set input, S, of an RS flip flop 520. Flip flop 520 includes a Q output which is coupled to one input 525A of a two input AND gate 525. It will be recalled from the earlier discussion that the /LINE AVAILABLE signal at processor output 410C indicates when the phone line is available, namely when the phone line is not being rung or when no other devices on the phone line are off-hook. The LINE AVAILABLE output 410C of processor 400 is coupled via an inverter 530 to the remaining input of AND gate 525. Thus, when the real time clock 515 generates the GO pulse, flip flop 520 is set and the Q output thereof goes high which causes AND input 525A to go high.

If the phone line is available, that is, if the LINE AVAILABLE signal is low, then a logic high is also applied to AND input 525B. Since under these conditions, both AND inputs 525A and 525B are high, the output of AND gate 525 generates an OK TO TRANSMIT signal which is high and which triggers data modem 510 to transmit the data collected by data collector 505. However, if the phone line is not available, as indicated by the /LINE AVAILABLE signal being low, then even though the real time clock 515 indicates that it is time to transmit, such transmission will be prevented from occurring while the phone line remains unavailable. Once transmission of the data by data modem 510 is complete, data modem 510 generates a DONE signal which is supplied to a reset input, R, of flip flop 520. Thus, flip flop 520 is reset after completion of data transmission and awaits the next GO pulse from real time clock 515.

Therefore, in this inbound circuit arrangement, inbound device 310 is blocked from transmitting any collected data at those times when one of the following conditions occurs: first, when another device on the phone line is "off hook" (in use) and, second, when the phone line is being rung.

The foregoing describes a signal processing circuit which determines the status of a telephone line, that is, determines whether the phone line is available or not available. In one embodiment, the signal processing circuit prevents analog phone line signals from being supplied to the alert detector of a telemetry device such as an MIU when it is determined that the phone line is not available. The circuit detects when a communications device on the phone line is off-hook to indicate that the phone line is not available. In another embodiment, the signal processing circuit detects when the phone line is ringing to indicate that the phone line is not available. In a preferred embodiment of the processing circuit, the ring detector and off-hook detector thereof are contained in common circuitry to minimize the parts count in the signal processing circuit. Advantageously, the signal processing circuit of the present invention does not interfere with the normal operation a phone line coupled thereto. The signal processing circuit is DC coupled to the phone line and operates at DC threshold voltage levels substantially less than the high voltage AC level associated with the high voltage ring signal. In fact the actual threshold voltage employed by the signal processing circuit is substantially less than the nominal DC phone line voltage as well.

While only certain preferred features of the invention have been shown by way of illustration, many modifications and changes will occur to those skilled in the art. It is, therefore, to be understood that the present claims are intended to cover all such modifications and changes which fall within the true spirit of the invention.

I claim:

1. A signal processing circuit for use with an inbound telemetry device which is couplable to a phone line, said phone line including a positive line and a negative line exhibiting a phone line voltage therebetween, at least one other communications device being couplable to said phone line, said processing circuit comprising:

a first input for coupling to said positive line;
a second input for coupling to said negative line;
a positive supply path coupled to said first input;
a negative supply path coupled to said second input;
a transistor, coupled to said positive and negative supply paths, said transistor generating an output signal exhibiting a first state when said phone line voltage is greater than a predetermined threshold voltage to indicate that said phone line is available for use by said inbound telemetry device, said output signal assuming a second state when said phone line voltage is less than said predetermined threshold voltage to indicate that said phone line is not available for use by said inbound telemetry device;
first isolating means coupled between said transistor and said positive supply path for preventing said transistor from drawing substantial current from said phone line;
second isolating means situated in said negative supply path for preventing said signal processing circuit from drawing substantial current from said phone line;

power supply means, coupled between said positive supply path and said negative supply path and including an output port, for deriving sufficient power from said phone line to supply operating power to said output port for use by an inbound telemetry device.

2. The signal processing circuit of claim 1 wherein ring signals are transmitted on said phone line, each ring signal being substantially sinusoidal and being separated in time from another ring signal by an inter-ring time interval, said circuit further comprising:

a ring timer circuit means, coupled to said transistor so as to receive said output signal therefrom, for generating a line not available signal whenever said output signal exhibits said second state and for generating a line available signal when said output signal has exhibited said first state for a period of time in excess of the inter-ring time interval.

3. A signal processing circuit for use with an inbound telemetry device which is couplable to a phone line, said phone line including a positive line and a negative line exhibiting a phone line voltage therebetween, at least one other communications device being couplable to said phone line, said processing circuit comprising:

a first input coupled to positive line;
a second input coupled to said negative line;
a current limiting resistor including first and second ends, the first end of said current limiting resistor being coupled to said negative input;
a transistor including an emitter, base and collector, said emitter being coupled to the second end of said current limiting resistor;
a pull-up resistor coupled between said positive input and said collector;
a bias resistor having first and second ends, the first end of said bias resistor being coupled to said emitter, the second end of said bias resistor being coupled to said base;
a zener diode coupled in parallel with said first input and the second end of said bias resistor to regulate the voltage therebetween;
a supply voltage port formed by said first input and the second end of said bias resistor for supplying power to an inbound telemetry device;
the value of said bias resistor being selected such that said transistor is biased on when said phone line voltage is greater than a predetermined threshold voltage so as to generate a logic low collector voltage to indicate that said phone line is available for use by said inbound telemetry device, and such that said transistor is biased off when said phone line voltage is less than said predetermined threshold voltage so as to generate a logic high collector voltage to indicate that said phone line is not available for use by said inbound telemetry device.

4. An inbound telemetry device which is couplable to a phone line, said phone line including a positive line and a negative line exhibiting a phone line voltage therebetween, at least one other communications device being couplable to said phone line, said inbound telemetry device comprising:

a first input for coupling to said positive line;
a second input for coupling to said negative line; data collecting means for collecting data from data sources;
data transmitting means, coupled to said data collecting means, for transmitting collected data over said phone line in response to a control signal;
a real time clock for generating a go signal at a predetermined time;
signal processing means, coupled to said phone line, for indicating when said phone line is available and not available, said signal processing means including:
a positive supply path coupled to said first input;
a negative supply path coupled to said second input;
a transistor, coupled to said positive and negative supply paths, said transistor generating an output signal exhibiting a first state when said phone line voltage is greater than a predetermined threshold voltage to indicate that said phone line is available for use by said inbound telemetry device, said output signal assuming a second state when said phone line voltage is less than said predetermined threshold voltage to indicate that said phone line is not available for use by said inbound telemetry device;
first isolating means coupled between said transistor and said positive supply path for preventing said transistor from drawing substantial current from said phone line;
second isolating means situated in said negative supply path for preventing said signal processing circuit from drawing substantial current from said phone line;
power supply means, coupled between said positive supply path and said negative supply path and including an power port, for deriving sufficient power from said phone line to supply operating power to said power port for use by an said inbound telemetry device;
logic circuit means, coupled to said real time clock, to said signal processing means and to said transmitting means, for generating said control signal to cause said transmitting means to transmit said collected data when said line signal processing means determines that said phone line is available and after said real time clock generates said go signal.

5. The inbound telemetry device of claim 4 wherein ring signals are transmitted on said phone line, each ring signal being substantially sinusoidal and being separated in time from another ring signal by an inter-ring time interval, said device further comprising:

ring timer circuit means, coupled to said transistor so as to receive said output signal therefrom, for generating a line not available signal whenever said output signal exhibits said second state and for generating a line available signal when said output signal has exhibited said first state for a period of time in excess of the inter-ring time interval.

6. A signal processing circuit for use with an outbound telemetry device which is couplable to a phone line, said phone line including a positive line and a negative line exhibiting a phone line voltage therebetween, said phone line being capable of communicating information signals thereon, at least one other communications device being couplable to said phone line, said processing circuit comprising:

a first input for coupling to said positive line;
a second input for coupling to said negative line;
a positive supply path coupled to said first input;
a negative supply path coupled to said second input;

first and second transistors, each including an emitter, base and collector, said first and second transistors being coupled together in a totem-pole arrangement between said positive and negative supply paths, the collector of said first transistor being coupled to said positive supply path, the emitter of said second transistor being coupled to said negative supply path, a limiter coupled to the collector of said first transistor such that said first transistor together with said limiter form an analog to digital converter for supplying a digital representation of information signals from said phone line to a signal output as a converted signal;

said second transistor being biased to turn on when said phone line voltage is greater than a predetermined threshold voltage and in response thereto said first transistor turns on such that said converted signal is supplied to said signal output;

said second transistor being biased to turn off when said phone line voltage is less than a predetermined threshold voltage and, in response thereto, said first transistor turns off such that no converted signal is provided to said signal output;

first isolating means coupled between said first transistor and said positive supply path for preventing said first transistor from drawing substantial current from said phone line;

second isolating means situated in said negative supply path for preventing said signal processing circuit from drawing substantial current from said phone line;

power supply means, coupled between said positive supply path and said negative supply path and including an output port, for deriving sufficient power from said phone line to supply operating power to said output port for use by an outbound telemetry device.

7. A signal processing circuit for use with an outbound telemetry device which is couplable to a phone line, said phone line including a positive line and a negative line exhibiting a phone line voltage therebetween, said phone line being capable of communicating information signals thereon, at least one other communications device being couplable to said phone line, said processing circuit comprising:

a first input for coupling to said positive line;
a second input for coupling to said negative line;
a positive supply path coupled to said first input;
a negative supply path coupled to said second input;
first and second transistors, each including an emitter, base and collector, said first and second transistors being coupled together in a totem-pole arrangement between said positive and negative supply paths, the collector of said first transistor being coupled to said positive supply path, the emitter of said second transistor being coupled to said negative supply path, a limiter coupled to the collector of said first transistor such that said first transistor together with said limiter form an analog to digital converter for supplying a digital representation of information signals from said phone line to a signal output as a converted signal;

a bias resistor coupled between the emitter and base of said second transistor and being situated in said negative supply path, said bias resistor exhibiting a resistance value selected such that said second transistor is biased to turn on when said phone line voltage is greater than a predetermined threshold voltage and in response thereto said first transistor turns on such that said converted signal is supplied to said signal output, and such that said second transistor is biased to turn off when said phone line voltage is less than a predetermined threshold voltage and in response thereto said first transistor turns off such that no converted signal is provided to said signal output;

a current limiting resistor situated in said negative supply path between said second input and the emitter of said second transistor, said current limiting resistor exhibiting a resistance value selected to prevent said signal processing circuit from drawing substantial current from said phone line;

a pull-up resistor coupled between said positive input and said collector, said pull-up resistor exhibiting a resistance value selected to prevent said first and second transistors from drawing substantial current from said phone line, and power supply means, coupled between said positive supply path and said negative supply path and including an output port, for deriving sufficient power from said phone line to supply operating power to said output port for use by an outbound telemetry device.

8. An outbound telemetry device couplable to a phone line, said phone line including a positive line and a negative line exhibiting a phone line voltage therebetween, said phone line being capable of communicating information signals including alert signals thereon, at least one other communications device being couplable to said phone line, said outbound telemetry device comprising:

a first input for coupling to said positive line;
a second input for coupling to said negative line;
signal processing means for selecting providing information signal from said phone line to a signal output, said signal processing means including
a positive supply path coupled to said first input;
a negative supply path coupled to sad second input;
first and second transistors, each including an emitter, base and collector, said first and second transistors being coupled together in a totem-pole arrangement between said positive and negative supply paths, the collector of said first transistor being coupled to said positive supply path, the emitter of said second transistor being coupled to said negative supply path, a limiter coupled to the collector of said first transistor such that said first transistor together with said limiter form an analog to digital converter for supplying a digital representation of information signals from said phone line to a signal output as a converted signal;

said second transistor being biased to turn on when said phone line voltage is greater than a predetermined threshold voltage and in response thereto said first transistor turns on such that said converted signal is supplied to said signal output;

said second transistor being biased to turn off when said phone line voltage is less than a predetermined threshold voltage and, in response thereto, said first transistor turns off such that no converted signal is provided to said signal output;

first isolating means coupled between said first transistor and said positive supply path for preventing said first transistor from drawing substantial current from said phone line;

second isolating means situated in said negative supply path for preventing said signal processing circuit from drawing substantial current from said phone line;

power supply means, coupled between said positive supply path and said negative supply path and including an output port, for deriving sufficient power from said phone line to supply operating power to said output port for use by an outbound telemetry device;

data collecting means for collecting data from data sources;

data transmitting means, coupled to said data collecting means, for transmitting collected data over said phone line in response to a control signal;

alert signal detecting means, coupled to said signal output and to said data transmitting means, for generating said control signal to instruct said data transmitting means to transmit said collected data when said detecting means detects the presence of said alert signal in said converted signal.

* * * * *